United States Patent [19]

Sakai et al.

[11] 4,324,995
[45] Apr. 13, 1982

[54] THRUST PREVENTIVE DEVICE FOR THE OUTPUT SHAFT OF AN ELECTRIC MOTOR

[75] Inventors: Noboru Sakai, Tachikawa; Tokuo Shimizu, Hachioji, both of Japan

[73] Assignee: Olympus Optical Co., Ltd., Tokyo, Japan

[21] Appl. No.: 127,249

[22] Filed: Mar. 4, 1980

[30] Foreign Application Priority Data

Mar. 12, 1979 [JP] Japan .............................. 54-31417[U]

[51] Int. Cl.³ .............................................. H02K 21/22
[52] U.S. Cl. ...................................... 310/153; 310/74; 74/572
[58] Field of Search ............... 310/DIG. 6, 266, 67 R, 310/92, 100, 74, 153, 66, 191, 75 R, 78, 103–106, 154, 156; 474/273; 74/572, 573

[56] References Cited

U.S. PATENT DOCUMENTS

| | | | |
|---|---|---|---|
| 2,666,509 | 1/1954 | Jaggi | 310/78 |
| 2,668,917 | 2/1954 | Uher | 310/78 UX |
| 2,982,872 | 5/1961 | Fredrickson | 310/163 |
| 3,097,316 | 7/1963 | Barden | 310/49 R |
| 3,290,528 | 10/1966 | Adler | 310/266 |
| 3,308,319 | 3/1967 | Faulhaber | 310/266 |
| 3,582,986 | 6/1971 | Yokoyama | 310/74 |
| 3,790,831 | 2/1974 | Morreale | 310/74 |
| 3,974,406 | 8/1976 | Wehde | 310/67 R |
| 4,162,419 | 7/1979 | De Angelis | 310/266 |

FOREIGN PATENT DOCUMENTS 51-74204  6/1976  Japan ................................... 310/266

*Primary Examiner*—R. Skudy
*Attorney, Agent, or Firm*—Frishauf, Holtz, Goodman and Woodward

[57] ABSTRACT

A thrust preventive device for the output shaft of an electric motor comprises an electric motor having one end face from which an output shaft is projected and a rotating force transmitting member secured outside the motor to a portion of the output shaft which is projected from the one end face of the motor. The one end face of the motor has a recess therein. The rotating force transmitting member comprises a fly-wheel and a pulley. The fly-wheel has one end face which opposes the one end face of the motor and another face which is connected to the pulley. A projection which is formed of iron is provided on the one end face of the fly-wheel and projects toward the one end face of the motor and into the recess. The projection is attracted in one direction taken along a central axis of the output shaft by the magnetic force from the permanent magnets which are located in the motor housing to rotate the output shaft. Therefore, the output shaft is biased in said one direction and is kept at a position thus biased.

8 Claims, 3 Drawing Figures

THRUST PREVENTIVE DEVICE FOR THE OUTPUT SHAFT OF AN ELECTRIC MOTOR

BACKGROUND OF THE INVENTION

This invention relates to a thrust preventive device for the output shaft of an electric motor wherein the output shaft is held in place, being kept biased in one direction taken along its central axis, by attracting or repelling a rotating force transmitting member fixed to it by the action of a magnetic force generated in a magnetic force generating portion provided at an end face of the motor from which is projected the output shaft.

An electric motor, particularly a coreless motor for use in a tape recorder for example, is required to rotate always at a fixed speed. To this end, it is necessary to keep always at a fixed value the friction loss of the parts associated with the motor rotation. Therefore, the load which is applied to the portions of sliding contact between a brush and a commutator of the motor or between the output shaft and a journal therefore must be kept fixed at all times throughout the motor rotation.

Meanwhile, where the tape recorder is of a portable or a pocketable type which can be put into the pocket of men's apparel or in a suit pocket, such tape recorder during its operation is not used being set at a fixed position but is usually used while it is being inclined at various angles taken with respect to the vertical or horizontal level. In this case, the output shaft of the motor, due to the weight of the relevant rotor, is arbitrarily moved in one direction or in the opposite along the central axis of the shaft. This causes a change in the magnitude of a load applied to the journal or in the direction in which such load is applied. This causes a change in the rotating speed of the motor, which change may give rise to wow and flutter.

A conventional coreless motor, therefore, for the purpose of eliminating such drawbacks, is designed such that the rotating force transmitting member comprised of a fly-wheel portion formed of a material magnetizable by a magnetic line of force and a rotating force transmitting portion constituted, for example, by a pulley is secured, by means of, for example, an adhesive or close fit, to the output shaft of the motor, whereby said fly-wheel portion is attracted by the magnetic line of force of a permanent magnet provided inside the motor to rotate the output shaft. In such a conventional coreless motor, however, once the fixation of the rotating force transmitting member to the output shaft is completed, it is difficult to change the position of the member relative to the output shaft. After such fixation, therefore, it becomes impossible to finely control the magnitude of that thrust of the output shaft which is produced by the attraction of the fly-wheel portion by the magnetic line of force.

SUMMARY OF THE INVENTION

The object of this invention is to provide a simplified thrust preventive device for the output shaft of a motor, which, even after the rotating force transmitting member is fixed to the output shaft, permits a change in the magnitude of a thrust obtained by having the said member biased in one direction taken along the central axis of the output shaft due to the effect of the magnetic line of force of the magnetic force generating section upon that transmitting member.

DETAILED DESCRIPTION OF THE PREFERRED EMBODIMENTS

Figure 1:
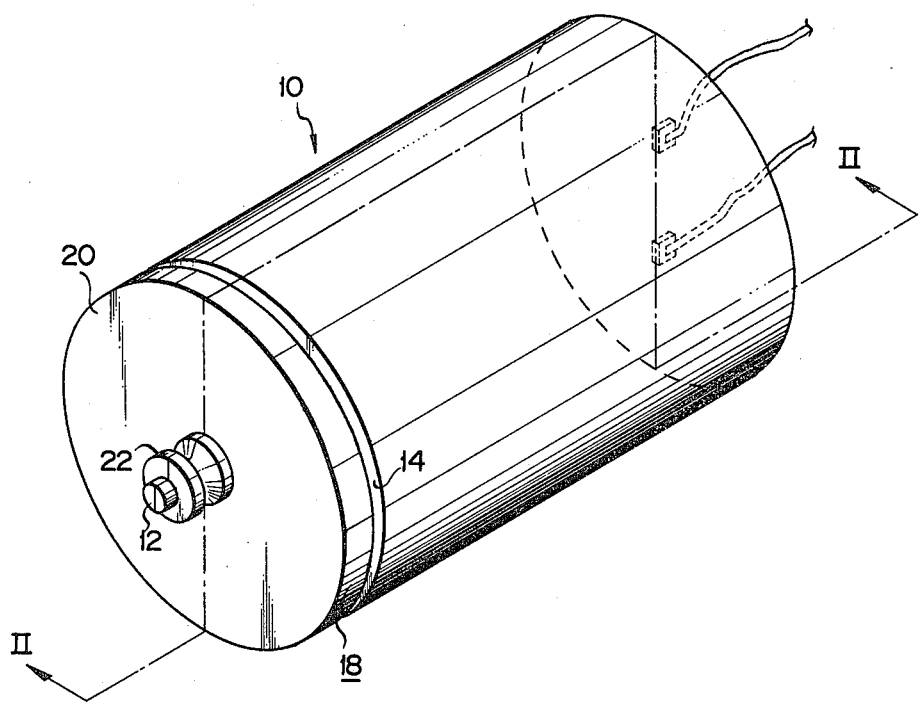
FIG. 1 is a perspective view showing a motor equipped with a thrust preventive device for an output shaft of a motor according to a first embodiment of this invention.

An electric motor 10 shown in FIG. 1 is a cylindrical coreless motor which is used in, for example, a tape recorder. The motor 10 has an end face 14 from which is projected an output shaft 12 of the motor 10. To the projected portion of the output shaft 12, as shown in FIG. 2, is secured by known means such as by an adhesive or close fit a rotating force transmitting member 18 in such a manner as to have one end 16 thereof facing the end face 14 of the motor 10.

Figure 2:
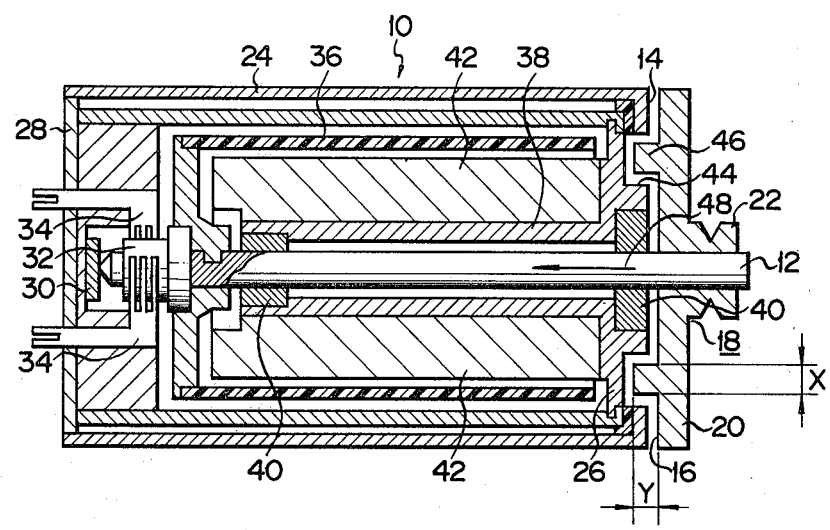
FIG. 2 is a schematic sectional view of the motor taken along the line II—II of FIG. 1.

The rotating force transmitting member 18, as shown in FIGS. 1 and 2, is comprised of a circular-plate like fly-wheel portion 20 having one end face 16 facing the end face 14, and a rotating force transmitting portion 22 comprised of, for example, a pulley which is provided connected to the other end face of the fly-wheel portion 20 to serve as a means to transmit the rotating force of the output shaft 12. Each of the fly-wheel portion 20 and the rotating force transmitting portion 22 is formed of a material, for example iron, which is magnetizable by a magnetic line of force.

As shown in FIG. 2, a housing of the motor 10 is comprised of a cylindrical case 24 disposed concentrically with the output shaft 12 and concurrently serving as a shield plate, a first end plate 26 which closes one end of the case 24 and constitutes the end face 14, and a second end plate 28 which closes the other end of the case 24 and concurrently serving as a shield plate.

The output shaft 12, as shown in FIG. 2, is received inside the housing except for the said projected portion. An end face of that portion of the output shaft 12 which is received inside the housing is located in the vicinity of the inner face of the second end plate 28 and is allowed to rotatably abut against a thrust preventive plate 30 provided on the inner face of the second end plate 28. On the circumferential surface of an end portion of the housing-received portion of the output shaft 12 is provided a commutator 32, which is contacted with a plurality of brushes 34 provided in the second end plate 28, each of which has terminals projected from the outer surface of the second end plate 28. On the circumferential surface of the housing-received portion of the output shaft 12 is secured a cylindrical plastic-molded armature winding 36 which adjoins the commutator 32 and has a known structure.

The first end plate 26 is formed of a material, for example brass, which the magnetic line of force passes through. As shown in FIG. 2, on the inner surface of the first end plate 26 is formed a cylindrical bearing-holding member 38 integrally therewith which is disposed concentrically with the output shaft 12, extending toward the commutator 32. The extended end of the cylindrical bearing-holding member 38 is located in the vicinity of a portion where the armature winding 36 is fixed to the output shaft 12. To that extended end of the bearing-holding member 38 is secured a radial bearing 40 which holds the output shaft 12 in place. A radial bearing 40 is also secured to a portion where the bearing-holding member 38 is provided connecting to the first end plate 26.

As shown in FIG. 2, on the outer circumferential surface of the cylindrical bearing-holding member 38, for the purpose of causing rotation of the output shaft 12, are provided a plurality of permanent magnets 42 each of which has a shape of a circular arc in cross-section. Each permanent magnet 42 is secured at the inner circumferential surface to the outer circumferential surface of the cylindrical bearing-holding member 38 and at one end to the inner face of the first end plate 26. In this embodiment, a plurality of said permanent magnets constitute a magnetic force generating portion which generates or develops the magnetic line of force.

In the outer surface of the first end plate 26, as shown in FIG. 2, is provided an annular recess 44 which is concentric with the output shaft 12. Further, an annular projection 46 concentric with the output shaft 12 is provided on the one end face 16 of the fly-wheel portion 20 in a manner to face the said recess 44 of the first end plate 26. Said projection 46 is formed of a material, for example iron, which can be magnetized by the magnetic line of force and, in this embodiment, is formed integrally with the fly-wheel portion 20. Further, the projection 46 projects toward the outer face of the first end plate 26 and its projected end is inserted into the recess 44 so as to be movable within the same.

In the first embodiment having the foregoing construction, the projection 46 is attracted, in a direction indicated by an arrow 48, by the action of the magnetic line of force generated in the permanent magnets 42 and leaking out of the first end plate 26. The output shaft 12, therefore, is biased in the arrow 48-indicated direction, i.e., one direction taken along the central axis of the output shaft 12, and is kept at a position in which it is thus biased.

In the above-mentioned embodiment, the dimension obtained in combination of the width "X" of the projection 46 taken in the radial direction of the motor 10, with the projected height "Y" of the fly-wheel portion 20 taken from the end face 16 thereof can be varied. This permits a change in the magnitude of a thrust obtained by having the rotating force transmitting member 18 biased, with it being fixed to the output shaft 12, in one direction taken along the central axis thereof due to the action of the magnetic line of force from the magnetic force generating section upon that member 18.

The above-mentioned variation in such dimension can easily be realized by subjecting the rotating force transmitting member 18 to a cutting process step using, for example, a lathe under the condition in which the rotating force transmitting member 18 is secured to the output shaft 12.

Figure 3:
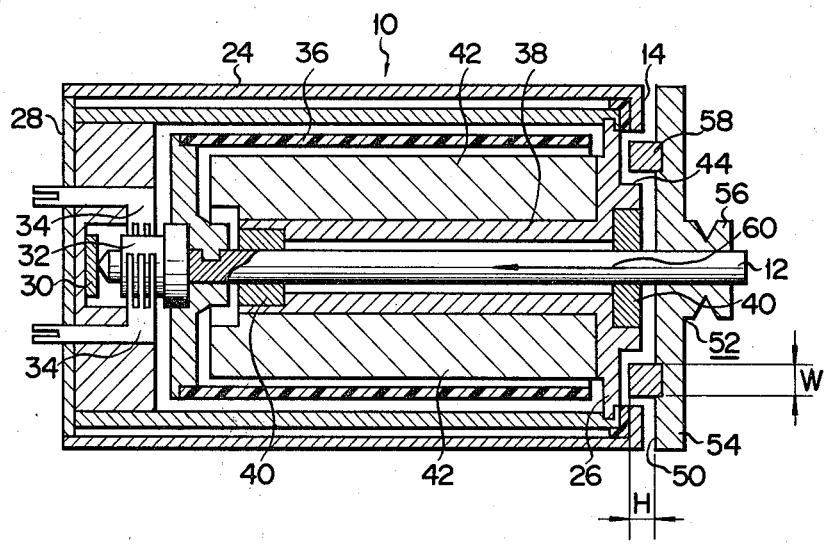
FIG. 3 is a view, taken in the same section as that shown in FIG. 2, of the motor according to a second embodiment of the invention.

We will now explain the thrust preventive device for an output shaft of a motor according to a second embodiment of this invention by reference to FIG. 3. In this embodiment, the same parts and portions or section as those stated in respect of said first embodiment are denoted by the same reference numerals and a detailed description of those constituent elements is omitted.

As shown in FIG. 3, the rotating force transmitting member 52 is fixed, by known means such as by an adhesive or close fit, to the portion of the output shaft 12 which projects from the electric motor 10 in a manner that its one end face 50 faces the end face 14 of the motor 10.

The rotating force transmitting member 52 is comprised of a circular-plate like fly-wheel portion 54 having the one end face allowed to oppose to the end face 14, and the rotating force transmitting portion 56 consisting of, for example, a pulley which is provided in a manner connecting to the other end face of the fly-wheel portion 54. In this embodiment, each of the fly-wheel portion 54 and the rotating force transmitting portion 56 is formed of brass.

The annular projection 58 concentric with the output shaft 12 is provided on the one end face 50 of the fly-wheel portion 54 of the rotating force transmitting member 52 in a manner that it opposes the recess 44 of the first end plate 26. The projection 58 is formed of a material, for example iron, which is magnetizable by the magnetic line of force. The projection 58 is secured, by known means such as by an adhesive or close fit, to the one end face 50 of the fly-wheel portion 54. The projection 58 projects toward the outer surface of the first end plate 26. The projected end of the projection 58 is inserted into the recess 44 so as to be free to move within the same.

In the second embodiment having the above-mentioned construction, the projection 58 is attracted, in a direction indicated by an arrow 60, by the action of the magnetic line of force of a plurality of the permanent magnets 42 which leak out from the first end plate 26. The output shaft 12, therefore, is biased in the arrow 60 indicated direction as taken along the central axis of the output shaft 12 and is kept at a position thus biased.

As in the first embodiment of the invention, this second embodiment enables a variation in the dimension obtained in combination of the width "W" of the projection 58 taken in the radial direction of the motor 10, with the projected height "H" of the fly-wheel portion 54 taken from the end face 50 thereof. This permits a change in the magnitude of a thrust obtained by having the rotating force transmitting member 52 biased, with it being fixed to the output shaft 12, in one direction taken along the central axis thereof due to the action of the magnetic line of force from the magnetic force generating section upon that member 18.

The said variation in such dimension, as in the case of the first embodiment, can easily be realized by subjecting the rotating force transmitting member 52 to a cutting process step using, for example, a lathe under the condition in which the rotating force transmitting member 52 is secured to the output shaft 12.

Since in this embodiment the rotating force transmitting member 52 is formed of brass, the machinability thereof is enhanced to shorten the cutting process as compared with the rotating force transmitting member 18 which is formed of iron as in the first embodiment. Since brass is larger in specific gravity than iron, the dimension of the fly-wheel portion 54 can be made smaller than the fly-wheel portion 20 in the first embodiment. Further, the effect of the fly-wheel portion 54 as a fly-wheel can be increased.

In the above-mentioned first and second embodiments, the annular projection 46 or 48 provided on the said one face 16 or 50 concentrically with the output shaft 12 is inserted into the annular recess 44 provided in the end face 14 of the motor 10 concentrically with the output shaft 12 thereof in a manner that it is free to move within the recess 44. Therefore, the dimension of the motor 10 as taken along the central axis of the output shaft 12 thereof can be made small to provide better compactness.

The above-mentioned embodiments are for the purpose of illustrating this invention and do not impose any limitation upon this invention. It will therefore be apparent that various modifications made within the technical scope of this invention are all covered by this invention.

For instance, the projection 46 or 58 may not be inserted into the recess 44 formed in the end face 14 of the motor 10.

Further, the magnetic force generating section may be a permanent magnet or an electro-magnet which is provided on the end face 14 of the motor 10 independently of the permanent magnet 42.

Further, the projection 46 or 58 may be formed of a permanent magnet. In this case, after replacement of the radial bearing 40 by a bearing serving concurrently both as a thrust bearing and as a radial bearing, the projection 46 or 58 is disposed so as to become repulsive to the magnetic line of force generated from the magnetic force generating section thereby to bias the output shaft 12 in a direction opposite to that which is indicated by the arrow 48 or 60 in FIG. 2 or FIG. 3.

Further, the electric motor 10 may be a disc-like coreless motor.

Further, the rotating force transmitting portion 22 or 56 may be a gear. Further, the rotating force transmitting member 18 or 52 may be constituted by the rotating force transmitting portion 22 or 56 alone.

What is claimed is:

1. A thrust preventive device for the output shaft of an electric motor, comprising:
    an electric motor having an end face on one end thereof from which an elongated rotatable output shaft of the motor is projecting;
    a recess provided on said end face of the motor;
    a rotating force transmitting member secured to a portion of the output shaft which is projected from said end face of the motor, said rotating force transmitting member being outside the motor and having one end face opposing said end face of the motor, said rotating force transmitting member including a fly-wheel portion and a rotating force transmitting portion directly coupled to the fly-wheel portion for transmitting the rotating force of the output shaft, said one end face of said rotating force transmitting member being on said fly-wheel portion;
    a projection of magnetizable material provided on said one end face of said rotating force transmitting member and projecting into said recess so as to bias said rotating force transmitting member when magnetized, jointly with the output shaft, by magnetic lines of force produced by the electric motor in one direction along the axis of said output shaft; and
    a position maintaining means located inside an other end of said motor for preventing said output shaft from biasing said rotating force transmitting member, thus keeping said output shaft at a predetermined position.

2. The thrust preventive device of claim 1, wherein said projection and said recess are both annular and concentric with said output shaft.

3. The thrust preventive device of claim 1, wherein said rotating force transmitting member is formed integrally with said projection and made of the same material as said projection.

4. The thrust preventive device of any one of claims 1, 2 or 3, comprising a magnetic force generating section within the motor and which includes at least one permanent magnet for causing said output shaft to rotate.

5. The thrust preventive device of claim 1 or 2, wherein said rotating force transmitting member is made of brass.

6. The thrust preventive device of claim 5, comprising a magnetic force generating section within the motor and which includes at least one permanent magnet for causing said output shaft to rotate.

7. The thrust preventive device of any one of claims 1, 2 or 3, wherein said rotating force transmitting portion of said rotating transmitting member is formed integrally with said fly-wheel portion of said rotating force transmitting member.

8. The thrust preventive device of claim 1 or 2, wherein said one end face of said rotating force transmitting member has a recess therein, said projection being fixedly mounted in said recess of said rotating force transmitting member while also projecting therefrom.

* * * * *